United States Patent
Schweiger

(10) Patent No.: US 8,567,791 B2
(45) Date of Patent: Oct. 29, 2013

(54) MULTI-LAYER STEEL INSERT FOR GASKETS

(75) Inventor: David J. Schweiger, Pewaukee, WI (US)

(73) Assignee: Dana Automotive Systems Group, LLC, Maumee, OH (US)

(*) Notice: Subject to any disclaimer, the term of this patent is extended or adjusted under 35 U.S.C. 154(b) by 406 days.

(21) Appl. No.: 12/925,737

(22) Filed: Oct. 28, 2010

(65) Prior Publication Data

US 2011/0101625 A1   May 5, 2011

Related U.S. Application Data

(60) Provisional application No. 61/280,055, filed on Oct. 29, 2009.

(51) Int. Cl.
    *F02F 11/00*   (2006.01)
(52) U.S. Cl.
    USPC .......................................... 277/598
(58) Field of Classification Search
    USPC .......................... 277/593, 595, 598
    See application file for complete search history.

(56) References Cited

U.S. PATENT DOCUMENTS

| | | | |
|---|---|---|---|
| 5,087,058 A | 2/1992 | Miura | |
| 5,522,604 A | 6/1996 | Weiss | |
| 5,803,465 A | 9/1998 | Schweiger | |
| 5,924,701 A * | 7/1999 | Schweiger | 277/597 |
| 6,126,172 A | 10/2000 | Okano | |
| 6,164,662 A | 12/2000 | Uemura | |
| 6,758,479 B2 | 7/2004 | Miyaoh | |
| 6,779,800 B2 * | 8/2004 | Udagawa | 277/592 |
| 2008/0007014 A1 | 1/2008 | Foster | |
| 2008/0237997 A1 * | 10/2008 | Murata et al. | 277/593 |
| 2009/0200751 A1 | 8/2009 | Widmann | |

FOREIGN PATENT DOCUMENTS

| | | |
|---|---|---|
| DE | 8102660 | 7/1981 |
| DE | 4009105 | 7/1991 |
| DE | 4337757 | 5/1995 |
| EP | 0333920 | 11/1988 |
| EP | 0431227 | 6/1991 |
| EP | 0440831 | 8/1991 |
| JP | 9210208 | 8/1997 |
| JP | 2002349345 | 12/2002 |

* cited by examiner

*Primary Examiner* — Vishal Patel
(74) *Attorney, Agent, or Firm* — Marshall & Melhorn LLC

(57) ABSTRACT

The present invention relates to a multi-layer steel insert for a cylinder head gasket for an internal combustion engine comprising. The cylinder head gasket may be made from metal or a composite material, and is disposed between a cylinder head and a cylinder block. The MLS insert may be located around at least one fluid passage aperture. The MLS insert has a first outside layer and a second outside layer each comprising an upper surface and a lower surface, an outer perimeter, an inner closed perimeter defining a fluid aperture, and a bead. The beads may be half beads or whole beads. An intermediate layer is arranged between the outside layers and includes an upper surface and a lower surface, an outer perimeter and an inner closed perimeter defining a fluid aperture. The MLS insert may be attached to the cylinder head gasket by mechanical or chemical means.

7 Claims, 4 Drawing Sheets

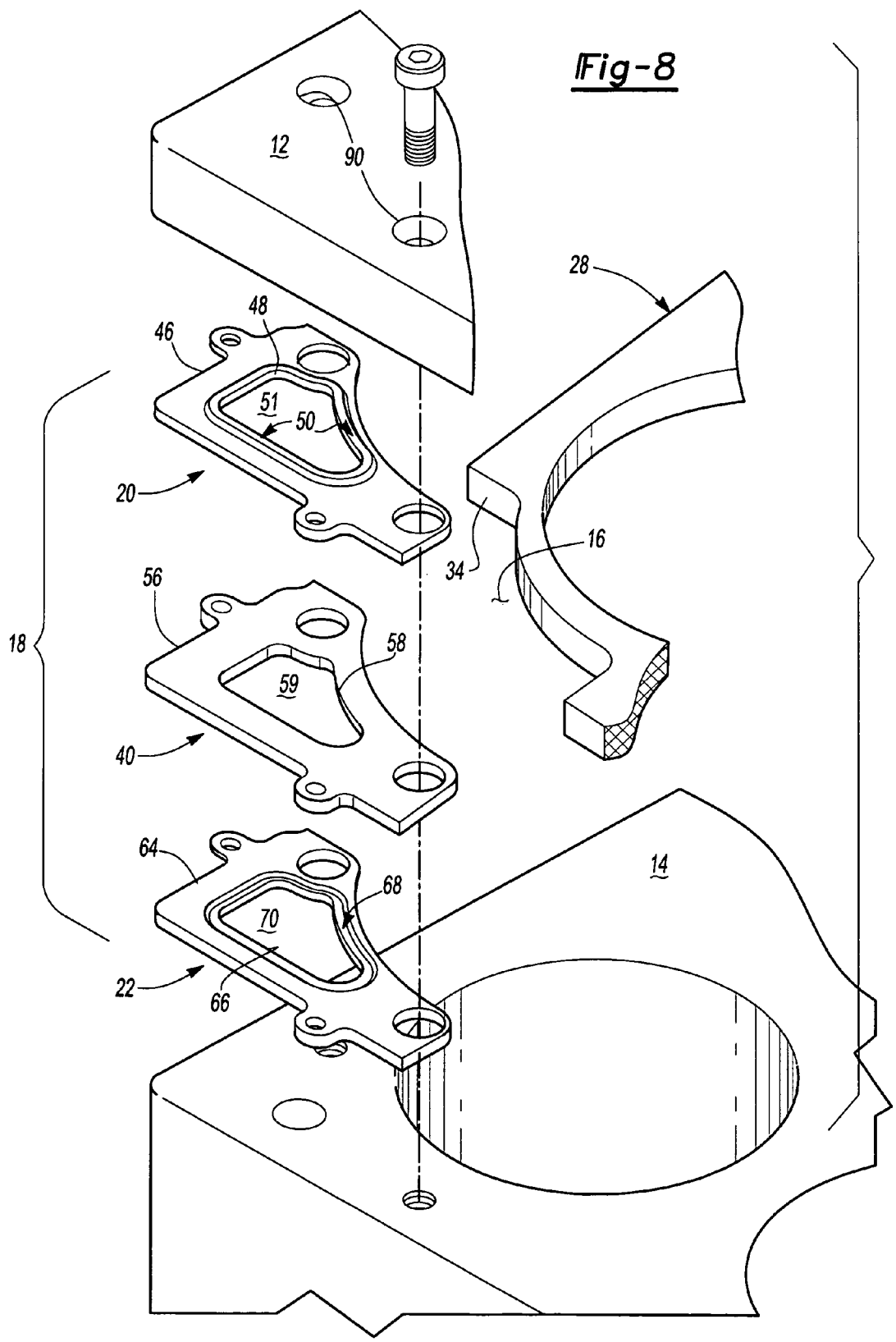

MULTI-LAYER STEEL INSERT FOR GASKETS

CROSS-REFERENCE TO RELATED APPLICATIONS

This application is a non-provisional application filed off of U.S. patent application Ser. No. 61/280,055 filed on Oct. 29, 2009, which is incorporated by reference in its entirety herein. This non-provisional application is being filed during the pendency of U.S. patent application Ser. No. 61/280,055.

FIELD OF THE INVENTION

The present invention relates to a multi-layer steel insert for a gasket, such as a cylinder head gasket for use in an internal combustion engine.

BACKGROUND OF THE INVENTION

This invention relates to a gasket, particularly a cylinder head gasket having a multi-layer steel (MLS) insert surrounding at least one fluid opening. Gaskets essentially are used to seal and prevent leakage between two parts. Cylinder head gaskets for internal combustion engines seal the gap between the cylinder head and the cylinder block. Sealing the gap, however, can be difficult because the head, block and gasket all move due to pressure and temperature fluctuations, which results in the gasket being subjected to constant pressure changes. There are also multiple openings in the head and the block for cylinder bores, fluid holes and bolts holes, to name a few. The areas around these openings are known to be put under additional stresses and leakage is common.

Traditionally, a molded rubber insert is used to address gasket leakage in the areas around fluid openings. The molded rubber insert is typically made solely from an elastomeric material, which has little or no structural integrity. Due to thermal motion, resulting from hot exhaust gases, increasing combustion pressure and steep thermal swings, sheer stresses are created in this area and the molded rubber insert does not adequately stop the leakage. Additionally the attack of fluids, such as coolant, water and oil, on the molded rubber insert reduces its effectiveness resulting in excessive compression-set, and also makes the molded rubber inserts more susceptible to wear. Ultimately, the molded rubber insert loses it recovery potential.

In view of the foregoing disadvantages of the prior art it would be advantageous for a gasket to be able to prevent or resist thermal motion to the extent that it negatively affects performance of the gasket. More specifically, it would be advantageous for a gasket to eliminate or prevent compression set and steer relaxation often seen in the prior art design.

SUMMARY OF THE INVENTION

The present invention is directed to a multi-layer steel (MLS) insert for a cylinder head gasket for an internal combustion engine. The cylinder head gasket may be made from metal, a composite material, or a combination of the two, and is disposed between a cylinder head and a cylinder block.

The MLS insert may be located around at least one fluid passage aperture, which may include coolant and/or oil passage apertures. The MLS insert has a first outside layer and a second outside layer each comprising an upper surface and a lower surface, an outer perimeter, an inner closed perimeter defining a fluid aperture, and a bead. The beads may be half beads or whole beads. An intermediate layer is arranged between the outside layers and includes an upper surface and a lower surface, an outer perimeter and an inner closed perimeter defining a fluid aperture.

The MLS insert may be attached to the cylinder head gasket by mechanical or chemical means.

BRIEF DESCRIPTION OF THE DRAWINGS

The above, as well as other advantages of the present invention will become readily apparent to those skilled in the art from the following detailed description when considered in the light of the accompanying drawings in which:

FIG. 8 depicts a partial perspective exploded view of the present invention with a cylinder head, a cylinder block and a cylinder head gasket.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
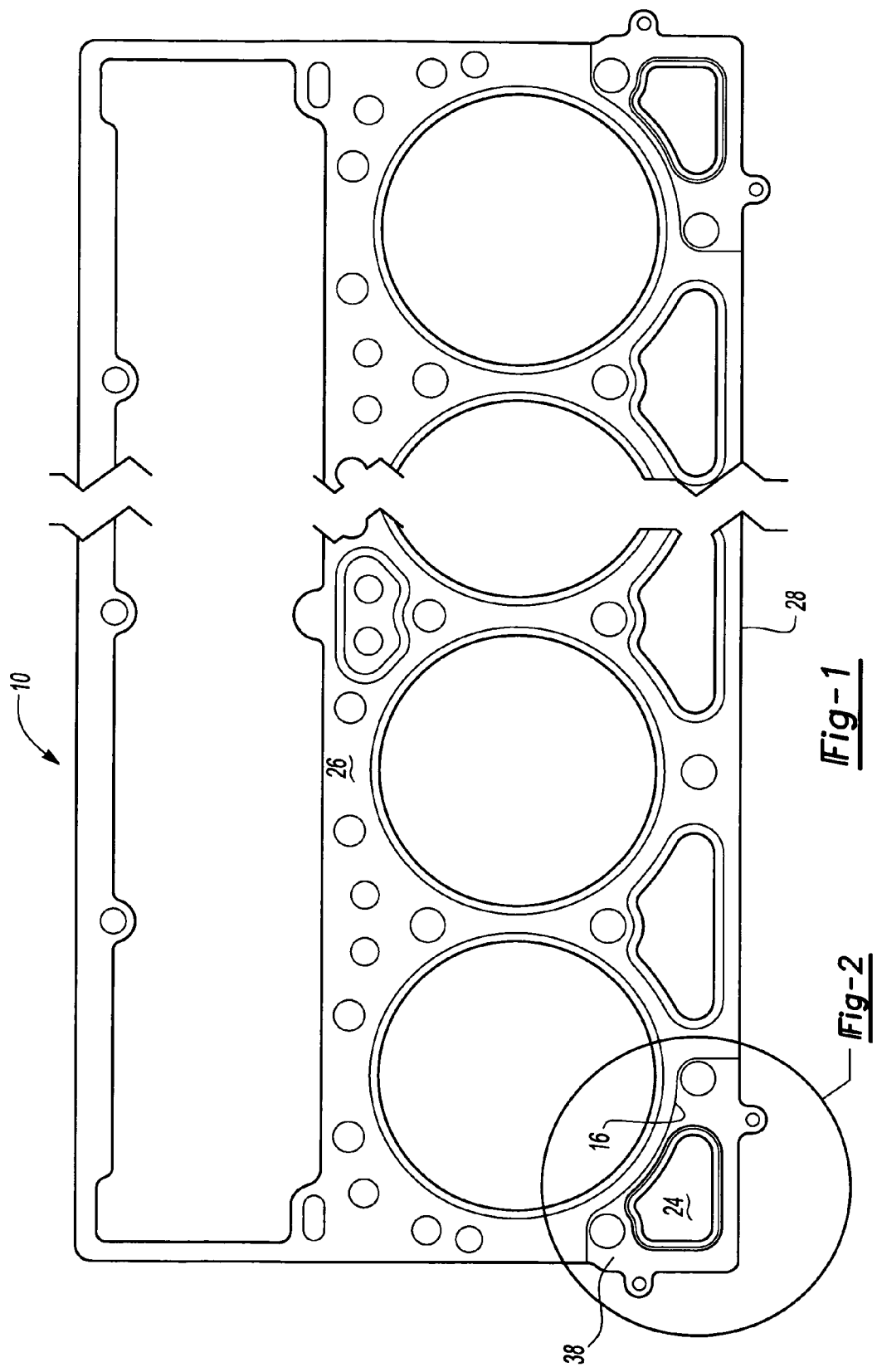
FIG. 1 is a top view of one embodiment of a cylinder head gasket.

Turning now to FIG. 1, one embodiment of a cylinder head gasket 10 is depicted. The cylinder head gasket 10 is situated between a cylinder head 12 and a cylinder block 14, as depicted in FIG. 8. The cylinder head gasket 10 may be made from metal, a composite material, or a combination of the two. Cylinder head gaskets are manufactured in accordance with the various shapes of engine blocks and heads, and include numerous openings, such as fluid openings for coolant and oil, bolt holes and openings for cylinder bores. Various sealing means are created for sealing around the respective openings.

As depicted in the embodiments of FIGS. 1 and 8, the cylinder head gasket 10 comprises a cut-out area 16 in at least one corner. As shown in FIG. 1, at least one corner may have a cut-out area 16, although it is within the scope of the invention for there to be more or less cut-out areas 16.

The cylinder head gasket 10 includes a MLS insert 18 having at least one outside layer 20 and a second layer 22. The MLS insert 18 is positioned within the cut-out area 16 and may be fastened to the cylinder head gasket 10 by mechanical or chemical means, such as by tabs or by an adhesive. The MLS insert 18 may also be placed into position next the cylinder head gasket 10 during assembly of the cylinder head 12 and the cylinder block 14, without being fastened to the cylinder head gasket 10. It is also within the scope of the present invention for MLS insert 18 to be located around a fluid aperture within the cylinder head gasket body or backland 26, and no just along the gasket outer perimeter 28 or in a corner.

Figure 2:
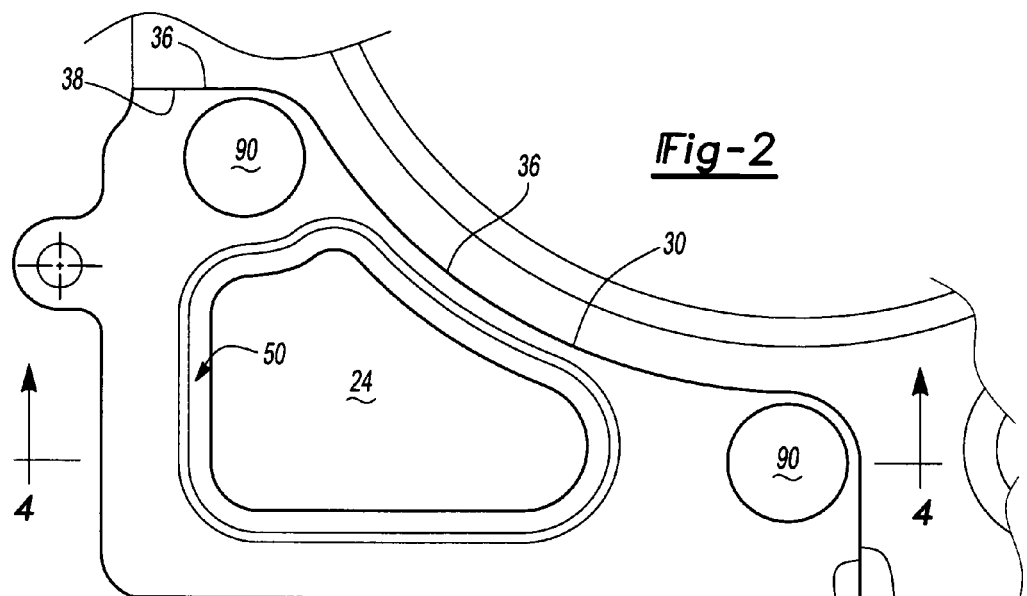
FIG. 2 is a top view of a portion of the gasket of FIG. 1.

At least one edge 30 of an outer perimeter 32 of the MLS insert 18 is complimentary to an outer edge 34 of the cut-out area 16 of the cylinder head gasket 10, and at least one edge 36 of the outer perimeter 32 of the MLS insert 18 is collinear with the outer perimeter 28 of the cylinder head gasket 10, as can be appreciated from FIGS. 1, 2 and 8. An inner portion 38 of the outer perimeter 32 of the MLS insert 18 abuts the backland 26 of the cylinder head gasket 10. The MLS insert 18 preferably incorporates at least one fluid aperture 24. The at least one fluid aperture 24 may include coolant and/or oil passages.

Figure 3:
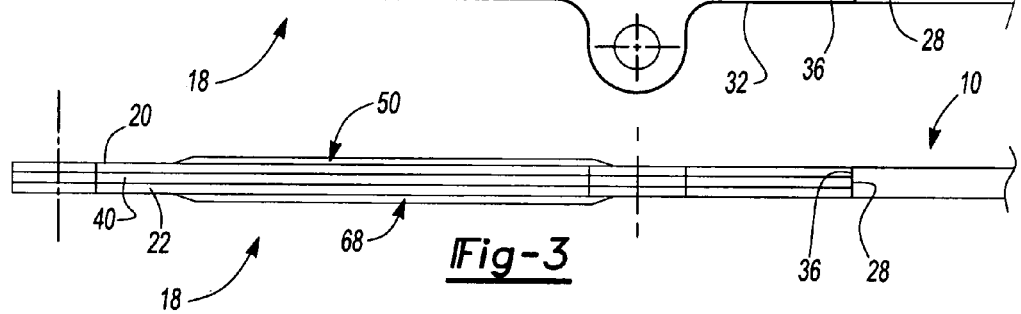
FIG. 3 is a side view of the cylinder head gasket of FIG. 2.
Figure 4:
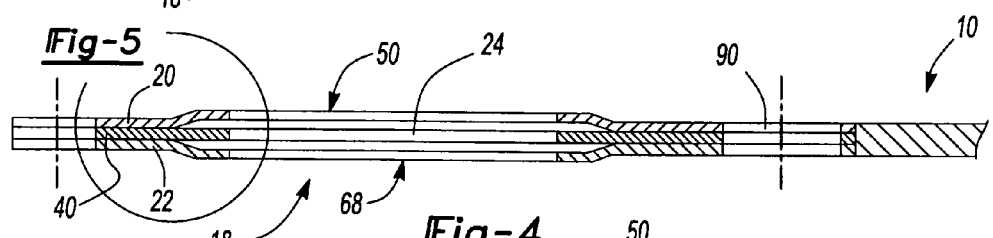
FIG. 4 is a cross-sectional view along line 4-4 of the detail of FIG. 2.

As depicted in FIGS. 3, 4 and 8, the MLS insert 18 comprises a first outside layer 20, an intermediate layer 40, and a second outside layer 22. The use of a MLS insert 18 eliminates the compression set and stress relation typically associated with the use of only a molded rubber insert that is the result of exposure to high temperatures and the attack of fluids, as such conditions over time work to break down the molded rubber composition. Due to the use of an MLS insert 18 recovery potential is maintained.

Figure 5:
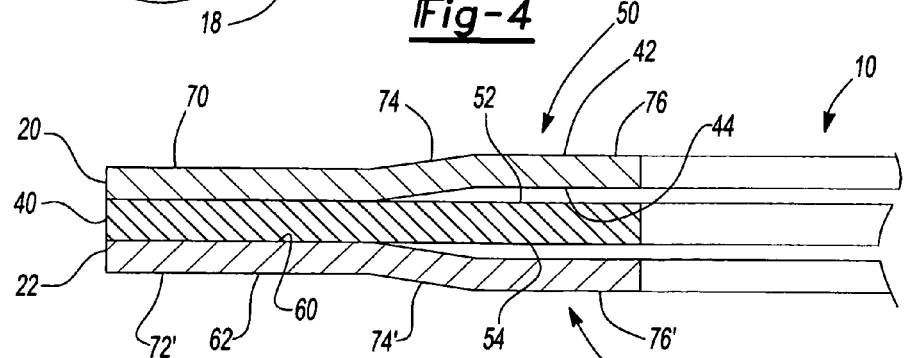
FIG. 5 is an enlarged portion of the gasket of FIG. 4.

As depicted in FIGS. 5 and 8, the first outside layer 20 comprises an upper surface 42 and a lower surface 44, an outer perimeter 46 and an inner closed perimeter 48 defining a fluid aperture 51 and a bead 50. The intermediate layer 40 comprises an upper surface 52 and a lower surface 54, an outer perimeter 56 and an inner closed perimeter 58 defining a fluid aperture 59. The second outside layer 22 comprises an upper surface 60 and a lower surface 62, an outer perimeter 64, an inner closed perimeter 66 defining a fluid aperture 70 and a bead 68.

All the layers 20, 22, 40 are metal, one piece, and integrally formed. The layers 20, 22, 40 are stacked in such a way that the lower surface 44 of the first outside layer 20 is in direct facing contact with the upper surface 52 of the intermediate layer 40, and the lower surface 54 of the intermediate layer 40 is in direct facing contact with the upper surface 60 of the second outside layer 22, as depicted in FIG. 5.

When the layers 20, 22, 40 are stacked, and in a compressed state, they maintain a substantially equal thickness to that of the cylinder head gasket 10, and the fluid apertures 51, 59, 70 are aligned with one another and have a complimentary shape to one another, as depicted in FIG. 8. The outer perimeters 46, 56, 64 and the inner closed perimeters 48, 58, 66 of the layers 20, 22, 40 are substantially the same shape.

The outside layers 20, 22 may be made of stainless steel and may be coated with an elastomer coating such as NBR (Nitrile Butadiene Rubber) or FKM (Fluroelastomer). FKM was originally developed by DuPont Performance Elastomers and is commonly known as VITON®, a registered trademark of Dupont. The upper and lower surfaces 52, 54 of the intermediate layer 40 are planar and parallel and define a substantially constant thickness, as shown in FIGS. 4 and 5. While one embodiment of the present inventions comprises a MLS insert 18 with three layers, other embodiments are within the scope of the present invention. For example, MLS inserts 18 having more or less layers are permissible. It is also within the scope of the present invention to eliminate the intermediate layer 40 entirely.

Each of the two outside layers 20, 22 may comprise high recovery half beads 50, 68, as shown in FIG. 5. Each of the half beads 50, 68 comprises a first planar section 72, 72', a ramp 74, 74' and a second planar section 76, 76'. The first planar section 72, 72' and the second planar section 76, 76' are on different horizontal planes. While one embodiment of the present invention comprises half beads 50, 68, it can also be appreciated that other embodiments are within the scope of the present invention, such as using whole beads 78, 80.

Figure 6:
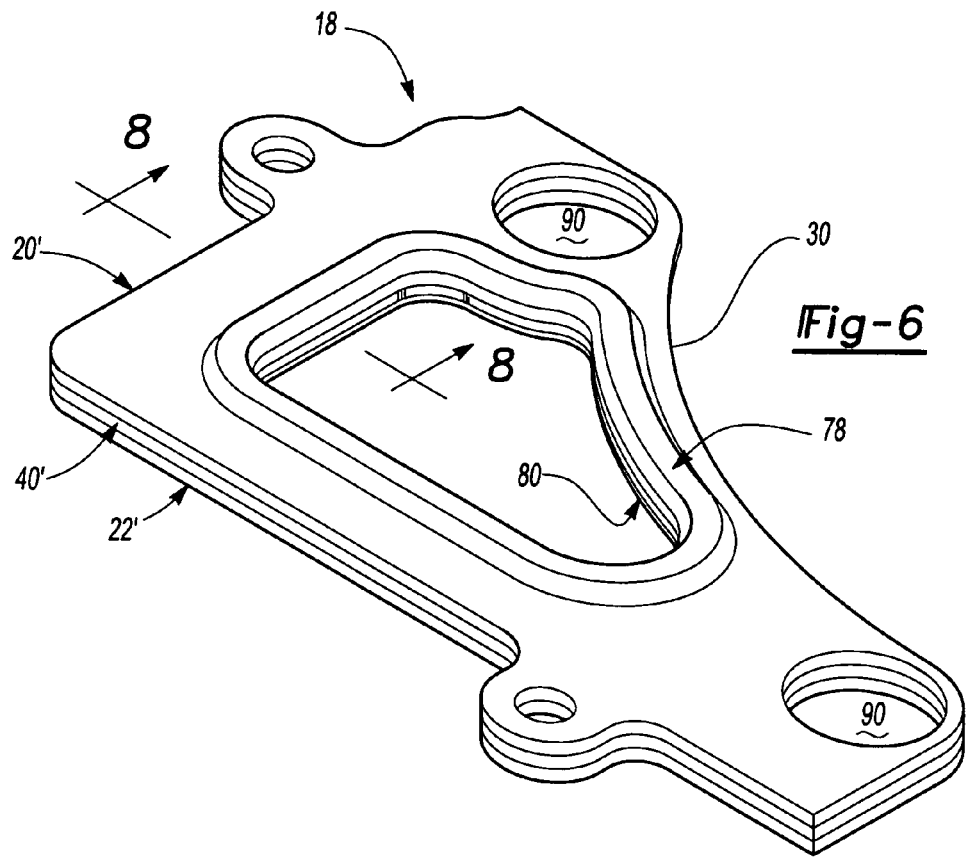
FIG. 6 depicts a perspective view of a second embodiment of the prevent invention.
Figure 7:
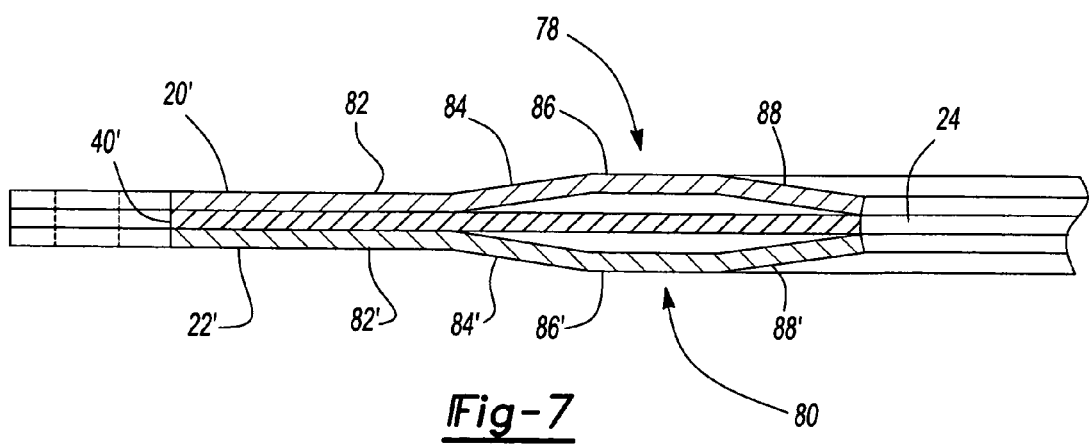
FIG. 7 depicts a side view along line 7-7 of the detail of FIG. 6.

The whole beads 78, 80, as shown in FIGS. 6 and 7, may be located on each of the outside layers 20' and 22'. Each of the whole beads 78, 80 comprise a first planar section 82, 82', a first ramp 84, 84', a second planar section 86, 86' and a second ramp 88, 88'. The first planar section 82, 82' and the second planar section 86, 86' are on differential horizontal planes.

The MLS insert 18 extends radially outward from the fluid passage aperture 24 and may encompass the bolt holes 90 adjacent the fluid passage aperture 24, as shown in FIGS. 1 and 2. This feature provides metal to metal contact between the cylinder head 12 and the cylinder block 14 at the cylinder head gasket joint. Due to the location of the MLS insert 18, between the cylinder head 12 and the cylinder block 14 relative to the bolt holes 90, there is improved bolt load retention because of the metal to metal contact. Such metal to metal contact is advantageous because it reduces the motion in this area caused by the thermal and/or mechanical movement between the cylinder head 12 and the cylinder block 14, and reduces bolt load relaxation. Additionally, the high recovery characteristics of the MLS insert 18 construction allow the MLS insert 18 to follow the motion of the cylinder head gasket joint.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A cylinder head gasket with an insert, comprising:
   a gasket comprising an outer perimeter and a plurality of cylinder bores, fluid holes and bolt holes, at least one of said fluid holes for oil or coolant;
   plurality of inserts, each insert comprising;
   a first outside layer comprising an upper surface and a lower surface, an outer perimeter, an inner closed perimeter defining a fluid aperture, and a bead;
   an intermediate layer comprising an upper surface and a lower surface, an outer perimeter and an inner closed perimeter defining a fluid aperture; and
   a second outside layer comprising an upper surface and a lower surface, an outer perimeter, an inner closed perimeter defining a fluid aperture, and a bead;
   wherein said outer perimeter of each layer defining a portion of said outer perimeter of said gasket, and wherein at least one edge of said outer perimeter of said each insert is collinear with said gasket outer perimeter; and
   said inserts and said gasket lie in same horizontal plane.

2. A cylinder head gasket with insert according to claim 1, wherein said cylinder head gasket is made of a composite material.

3. A cylinder head gasket with insert according to claim 1, wherein said cylinder head gasket is made from metal.

4. A cylinder head gasket with insert according to claim 1, wherein each layer of said insert is unitary and metallic.

5. A cylinder head gasket with insert according to claim 1, wherein said beads are half beads.

6. A cylinder head gasket with insert according to claim 1, wherein said beads are full beads.

7. A cylinder head gasket with insert according to claim 1, wherein a thickness of said insert is substantially equal to a thickness of said gasket.

* * * * *